DECIMAL-TO-BINARY CONVERTER

Filed March 20, 1961 2 Sheets-Sheet 1

ALFRED N. ORMOND,
INVENTOR.

BY Nilsson & Robbins
ATTORNEYS.

ALFRED N. ORMOND, INVENTOR.

By Nilsson & Robbins

ATTORNEYS

3,229,277 DECIMAL-TO-BINARY CONVERTER

Alfred N. Ormond, 9107 5th Ave., Inglewood, Calif.

Filed Mar. 20, 1961, Ser. No. 96,927
3 Claims. (Cl. 340—347)

The present invention relates to a code conversion system, and particularly to an apparatus for converting decimal indications into digital binary form.

As a result of the long and universal use of decimal numbers, values represented in that form are most-readily perceived and manipulated in manual operations. However, electrical and mechanical systems employed to process data and perform control functions are often more economical if numerical representations are manifest in binary code. Therefore, a considerable need exists for an economical system to rapidly and accurately convert decimal representations indicative of a numerical value into equivalent binary representations.

Various forms of decimal-to-binary converters have been proposed; however, none of these systems have represented the optimum in economy and accuracy. The present invention is an improved decimal-binary converter, which registers a decimal value by the settings of several sets of ganged switches. The ganged switches are then electrically interconnected in accordance with a predetermined pattern so that a source of electrical signals is selectively connected to energize various binary devices which manifest the value originally represented in decimal form.

An object of the present invention is to provide an improved decimal-to-binary converter, which may be economically manufactured from readily-available component parts.

Another object of the present invention is to provide a decimal-to-binary conversion system which operates with a high degree of accuracy and does not present ambiguous manifestations.

Still a further object of the present invention is to provide a conversion system which is extremely reliable, and convenient for manual use.

These and other objects of the present invention will become apparent from a consideration of the following, taken in conjunction with the drawings, wherein.

Figure 1:
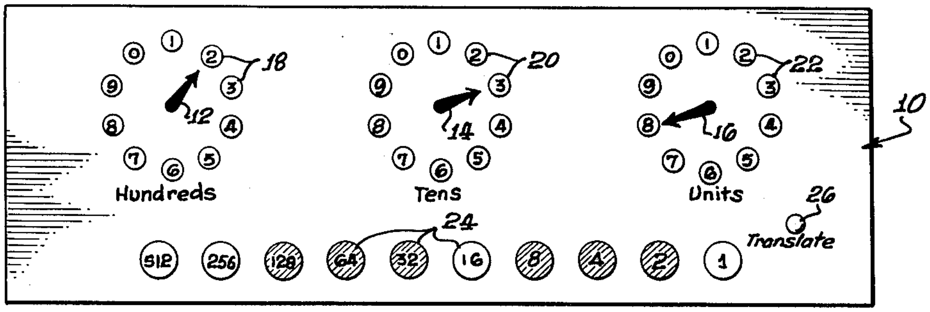
FIG. 1 is a front elevational view of an apparatus constructed in accordance with the present invention.

Referring initially to FIG. 1, there is shown a panel 10 having three rotary knobs 12, 14 and 16 mounted thereon. The knobs have ten stable positions and may be variously manually positioned so that the pointer of the knob indicates a particular decimal digit from zero to nine in accordance with the numerical markings 18, 20 and 21 on the panel.

The knob 16 and the associated markings 22 are employed for the unit decimal digit while the knob 14 and the markings 20 serve to indicate tens, and the knob 12 with the markings 18 indicate hundreds. Therefore, by variously positioning the three knobs, any three-digit decimal value may be indicated. For example, in the configuration in which the knobs are shown with the knob 12 indicating two, the knob 14 indicating three, and the knob 16 indicating eight, they manifest two hundred thirty-eight.

Mounted below the knobs and markings described above, are a series of lamps 24 which indicate a sequence of binary digits representative of 1, 2, 4, 8, 16, 32, 64, 128, 256 and 512. These lamps are normally either "on" or "off" and therefore they may be considered as binary devices.

A button 26, also mounted on the panel 10 serves to energize the system contained behind the panel with the result that the lamps 24 manifest (in binary form) the decimal value indicated by the knobs 12, 14 and 16. For example, with the knobs set as shown to indicate a decimal value of two hundred thirty-eight, pressing the button 26 results in the illumination of those lamps 24 which indicate the binary digits 2, 4, 8, 32, 64 and 128 representing a total value of two hundred thirty-eight in binary form.

Of course, the apparatus of the present invention may also be coupled into a data-processing or control system so that the binary signals serving to selectively illuminate the lamps 24, are employed to perform various control functions within the system. The particular application for the signals manifesting binary values is not within the scope of the present invention; however, it is to be understood that the present invention is applicable to a wide variety of mechanical and electrical systems.

Figure 2:
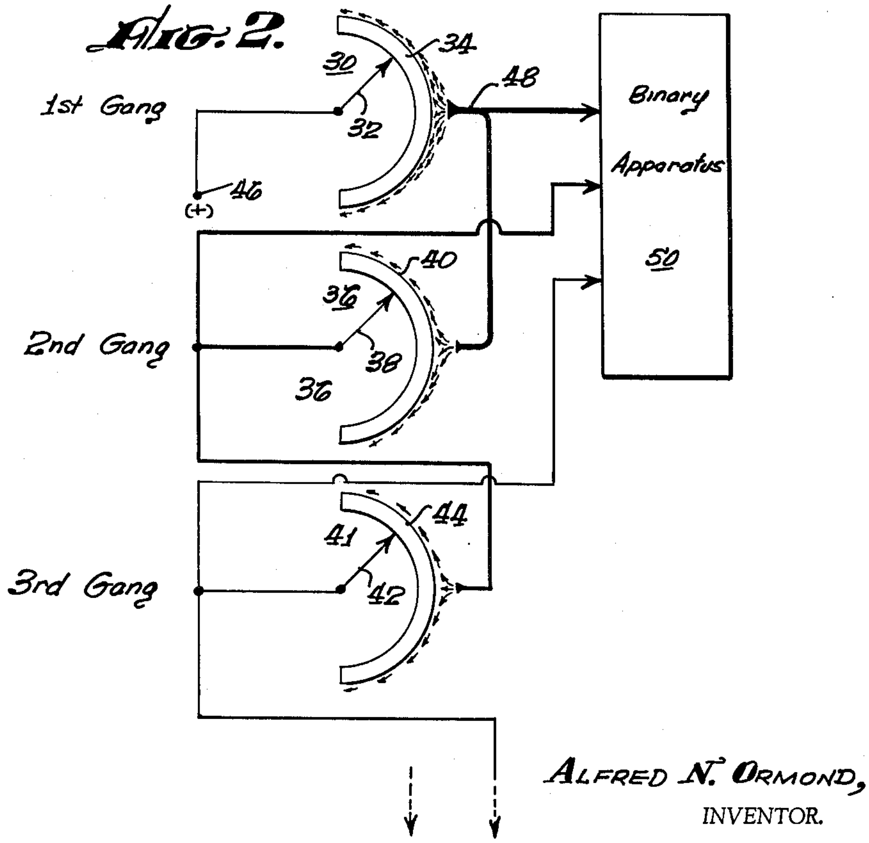
FIG. 2 is a diagrammatic representation of information-flow paths in an apparatus constructed in accordance with the present invention.

In the system of FIG. 1 each of the knobs 12, 14 and 16 is mechanically coupled to a set of ganged rotary switches each of which has one movable contact that may be placed in any of ten different positions to indicate decimal digits from zero to nine. In FIG. 2 the pattern of connections between the sets of switches is generally indicated. A first gang of switches serving to register units is generally indicated by the numeral 30. The several individual movable contacts of the switches are represented by a single composite contact 32 and the various stationary contacts which may be engaged by the movable contacts 32 are represented by an arc of stationary contacts 34. The second gang of switches (employed in the "tens" portion of the system) is designated at 36 by a single composite movable contact 38 and an arc of stationary contacts 40. The gang of switches for registering "hundreds," is designated at 48 and similarly represented by a single composite movable contact 42 and an arc of stationary contacts 44.

Considering the signal-flow paths through the system of FIG. 2, each of the individual movable contacts represented by the composite contact 32 is connected to a terminal 46 adapted to be connected to a source of electrical potential. Therefore, electrical currents flow from the terminal 46 through the individual movable contacts in the gang of switches 30, to be received by the various stationary contacts in the arc 34 and distributed as indicated by the current paths 48. Specifically, a portion of the currents from the stationary contacts represented by the arc 34 are passed to energize certain individual binary devices in a binary apparatus 50. The remaining portion of the signal paths are connected to the stationary contacts represented by the arc 40 in the gang of switches 36. Certain selected current paths are then completed through the movable contacts 38 in the gang of switches 36 and applied both to the binary apparatus 50 and to the stationary contacts represented by the arc 44 in the gang of switches 41. Again, further selectivity results in a portion of the current paths applied to the arc of contacts 44 being connected by the movable contacts 42 to the binary apparatus 50 and to the movable contacts of the subsequent gang of switches.

In the operation of the system of FIG. 2, electrical energy drawn from the terminal 46 is selectively passed through the gang of switches 30 (from movable contacts to stationary contacts) which determines whether or not certain binary devices should be energized. The energy may also be transferred through the gang of switches 36 (from stationary contacts to movable contacts) and again the energization of certain binary devices is determined and may or may not result in electrical currents passing to the apparatus 50. It is to be noted, that in the initial gangs of switches 30 and 36, the signal paths are connected from stationary contacts in the first gang to the stationary contacts of the second gang. However, the connections between the gang of switches 36 and the gang of switches 41 (and all subsequent gangs of switches) are made differently, from the movable contacts of the less-significant digit gang to the stationary contacts of the more-significant digit gang. This manner of connection is illustrated between the gang of switches 36, and the gang of switches 41.

Thus the system functions with each gang of switches (set to manifest a particular decimal digit) performing switching operations to selectively energize certain binary devices which ultimately result in the full binary equivalent of the selected decimal value. In considering the system, various numbers of sets or ganged switches may be employed depending upon the range desired. Of course, as the number of gangs of switches is increased (to accommodate higher values) the complexity of the wiring is similarly increased to accommodate additional signal paths. In view of the complexity in illustrating these connections, preliminary to considering the signal paths required in the system of FIG. 2, a system of FIG. 3 will be considered which illustrates the signal paths in a system constructed in accordance with the present invention and capable of accommodating decimal numbers to ninety-nine.

Figure 3:
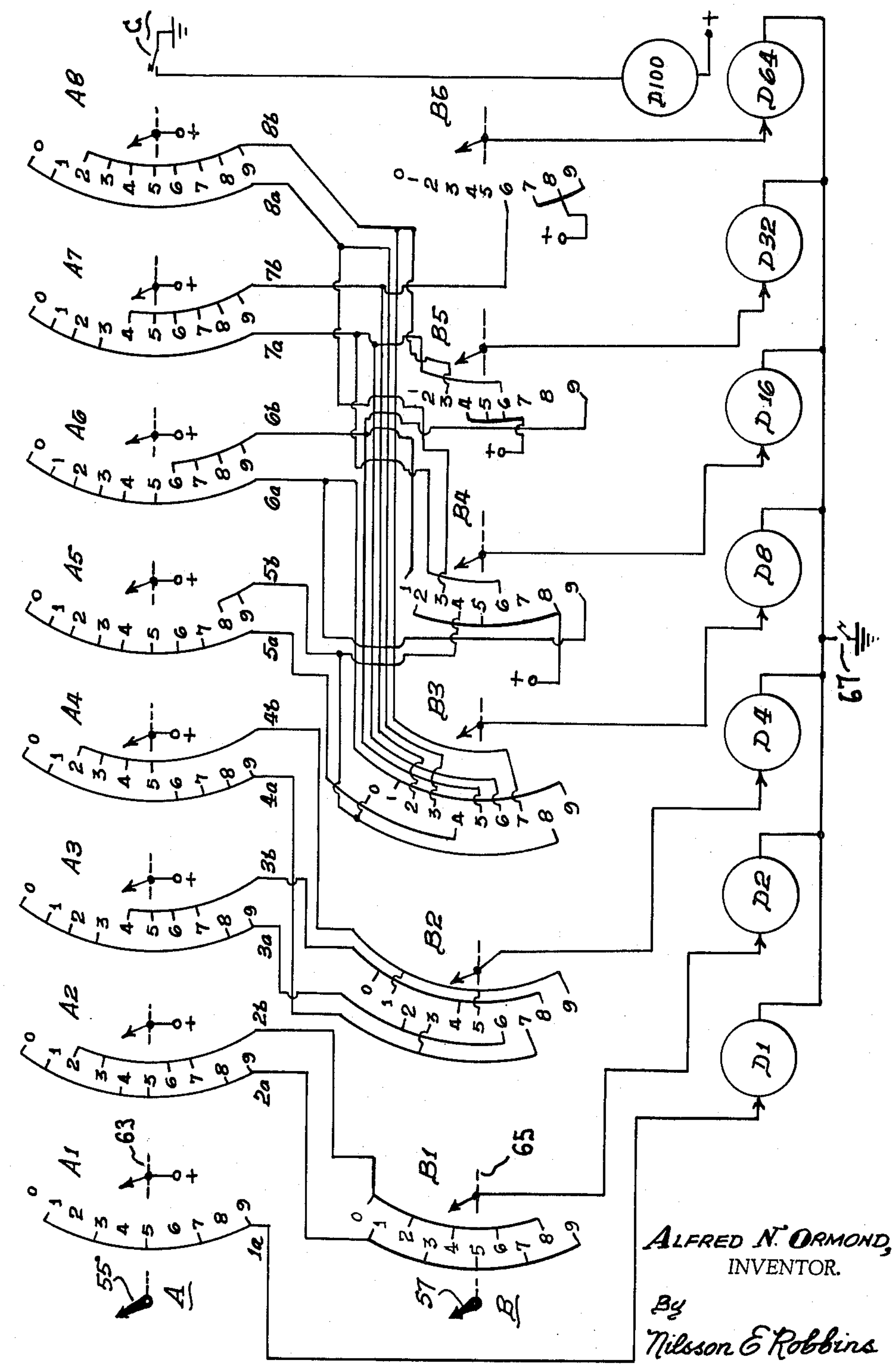
FIG. 3 is a diagrammatic representation of the electrical system in an apparatus constructed in accordance with the present invention.

FIG. 3 shows two sets of ganged switches designated A and B. The switches are shown in an arc form rather than a circular form, in order to render the diagram less confusing. The set A includes eight multi-contact rotary switches designated A1, A2, A3, A4, A5, A6, A7 and A8 ganged together on a common rotative shaft 61 for common movement. These switches may be all similar and comprise any switch in which a movable contact may be placed in ten different positions, at least some of which serve for the engagement of stationary contacts. The stationary contacts in the switches of set A are designated by numbers coinciding to the setting of a knob 55 employed to set these switches.

The second set of switches B includes six ten-position rotary switches B1 through B6 ganged together on a common shaft 63. The set B of switches are placed in any of ten positions in accordance with the setting of a knob 57.

The switches in the sets A and B are electrically connected between a source of potential designated (+) and a series of binary devices designated D1, D2, D4, D8, D16, D32 and D64. These devices may take various forms, depending upon the application of the present system, for example, the devices may be relays, lights, control devices or various other means to manifest values in binary form.

The movable contacts of all the switches in the set B are connected to the source of potential (+). The odd stationary contacts of the switch A1 are connected to the binary device D1. Stationary contacts of other switches in the set A are connected to various stationary contacts of switches in the set B. The movable contacts of the switches in set B are then individually connected to the other binary devices D2, D4, D8, D16, D32 and D64. The binary devices are all connected to ground potential through a switch 65.

In the operation of the system of FIG. 3, the knob 55 is set to indicate "units" and the knob 57 is set to indicate "tens." For example, the knob 57 may be set to designate a "two" while the knob 55 is set to designate a "zero" so that the knobs indicate decimal "twenty." Of course, in this setting all of the movable contacts in the set A of switches are on the stationary contact 0 while all of the movable contacts in the set B of switches are on the stationary contact 2.

In such an instance, closing the switch 65 results in a current from the positive source (+) through the movable contact of the switch A3, the conduct 3A, the stationary contact 2 in the switch B2, then through the movable contact of the switch B2 to energize the binary device D4. Similarly, a current passes from the source of positive potential (+) through the stationary contact 2 of the switch B4 and the movable contact of the same switch to energize the binary device D16. Therefore, the binary devices D4 and D16 are energized manifesting the value "twenty" in binary form.

Of course, some 99 different combinations are possible in the system of FIG. 3 to convert values of 0 through 99 from a decimal form into a binary form using the switches A and B. However, the range is increased to 199 by adding a two-state switch C connected from a source of potential (+) to a binary device D100 which is connected to ground. This technique adds two steps to the existing configuration. This system is more perceivable from considering FIG. 3 than from a detailed recitation of the signal paths. However, to supplement the disclosure of FIG. 3 charts are set forth below defining the various current or signal paths which are possible to energize the various binary devices.

SWITCH SET A (UNITS)

| Section (Switch) | Common Contacts | Input | Output |
|---|---|---|---|
| A1 | 1, 3, 5, 7, 9 | + | Binary 1. |
| A2 | 0, 1, 4, 5, 8, 9 | + | Lead 2a. |
| A2 | 2, 3, 6, 7 | + | Lead 2b. |
| A3 | 0, 1, 2, 3, 8, 9 | + | Lead 3a. |
| A3 | 4, 5, 6, 7 | + | Lead 3b. |
| A4 | 0, 1, 6, 7, 8, 9 | + | Lead 4a. |
| A4 | 2, 3, 4, 5 | + | Lead 4b. |
| A5 | 0, 1, 2, 3, 4, 5, 6, 7 | + | Lead 5a. |
| A5 | 8, 9 | + | Lead 5b. |
| A6 | 0, 1, 2, 3, 4, 5 | + | Lead 6a. |
| A6 | 6, 7, 8, 9 | + | Lead 6b. |
| A7 | 0, 1, 2, 3 | + | Lead 7a. |
| A7 | 4, 5, 6, 7, 8, 9 | + | Lead 7b. |
| A8 | 0, 1 | + | Lead 8a. |
| A8 | 2, 3, 4, 5, 6, 7, 8, 9 | + | Lead 8b. |

SWITCH SET B (TENS)

| Section (Switch) | Common Contacts | Input | Output (From Movable Contact) |
|---|---|---|---|
| B1 | 1, 3, 5, 7, 9 | 2a | Binary 2. |
| B1 | 0, 2, 4, 6, 8 | 2b | Binary 2. |
| B2 | 2, 6 | 3a | Binary 4. |
| B2 | 0, 4, 8 | 3b | Binary 4. |
| B2 | 3, 7 | 4a | Binary 4. |
| B2 | 1, 5, 9 | 4b | Binary 4. |
| B3 | 4 | 5a | Binary 8. |
| B3 | 0, 8 | 5b | Binary 8. |
| B3 | 1, 9 | 6a | Binary 8. |
| B3 | 5 | 6b | Binary 8. |
| B3 | 6 | 7a | Binary 8. |
| B3 | 2 | 7b | Binary 8. |
| B3 | 3 | 8a | Binary 8. |
| B3 | 7 | 8b | Binary 8. |
| B4 | 2, 5, 8 | + | Binary 16. |
| B4 | 4 | 5b | Binary 16. |
| B4 | 9 | 6a | Binary 16. |
| B4 | 1 | 6b | Binary 16. |
| B4 | 6 | 7a | Binary 16. |
| B4 | 3 | 8a | Binary 16. |
| B5 | 4, 5 | + | Binary 32. |
| B5 | 9 | 6b | Binary 32. |
| B5 | 6 | 7b | Binary 32. |
| B5 | 3 | 8b | Binary 32. |
| B6 | 7, 8, 9 | + | Binary 64. |
| B6 | 6 | 7b | Binary 64. |

In the charts set out above, the heading "switch" designates the particular switch for which connections are defined in the associated row. The "common contacts" of such switch are then electrically connected. The inputs and outputs to the switches are then indicated in the third and fourth columns.

The above description with reference to FIG. 3 indicates that the system of the present invention may be readily applied to convert decimal values into an equivalent binary form. As previously indicated, various numbers of ganged sets of switches may be provided in the system to accommodate numerical values of greater magnitude. In general, the illustration of systems of this type becomes exceedingly complex and difficult. However, an embodiment of a system employing three sets of ganged switches (as shown in FIGS. 1 and 2) to accommodate decimal values to nine hundred ninety-nine is described in a chart set forth below. In general, the format of the chart is similar to that above, and is somewhat self-explanatory. The first set of ganged switches is connected identically to the connections in the two-decimal digit system. Therefore, this portion of the chart is not repeated.

SWITCH GANG B (TENS)

| Lead Input | Section (Switch) | Common Contacts | Output (From Movable Contact) |
|---|---|---|---|
| 2a | 1 | 1, 3, 5, 7, 9 | Binary 2. |
| 2b | 1 | 0, 2, 4, 6, 8 | Binary 2. |
| 3a | 2 | 2, 6 | Contact W2. |
| 3a | 3 | 0, 4, 8 | Contact W3. |
| 3b | 2 | 0, 4, 8 | |
| 3b | 3 | 2, 6 | |
| 4a | 2 | 3, 7 | |
| 4a | 3 | 1, 5, 9 | |
| 4b | 2 | 1, 5, 9 | |
| 4b | 3 | 3, 7 | |
| 5a | 4 | 4 | Contact W4. |
| 5a | 5 | 2 | Contact W5. |
| 5a | 6 | 0, 8 | Contact W6. |
| 5a | 7 | 6 | Contact W7. |
| 5b | 4 | 0, 8 | |
| 5b | 5 | 6 | |
| 5b | 6 | 4 | |
| 5b | 7 | 2 | |
| 6a | 4 | 1, 9 | |
| 6a | 5 | 7 | |
| 6a | 6 | 5 | |
| 6a | 7 | 3 | |
| 6b | 4 | 5 | |
| 6b | 5 | 3 | |
| 6b | 6 | 1, 9 | |
| 6b | 7 | 7 | |
| 7a | 4 | 6 | |
| 7a | 5 | 4 | |
| 7a | 6 | 2 | |
| 7a | 7 | 0, 8 | |
| 7b | 4 | 2 | |
| 7b | 5 | 0, 8 | |
| 7b | 6 | 6 | |
| 7b | 7 | 4 | |
| 8a | 4 | 3 | Contact W4. |
| 8a | 5 | 1, 9 | Contact W5. |
| 8a | 6 | 7 | Contact W6. |
| 8a | 7 | 5 | Contact W7. |
| 8b | 4 | 7 | |
| 8b | 5 | 5 | |
| 8b | 6 | 3 | |
| 8b | 7 | 1, 9 | |
| + | 8 | 2, 5, 8 | Contact W8. |
| + | 9 | 1, 4, 7 | Contact W9. |
| + | 10 | 3, 6, 9 | Contact W10. |
| + | 11 | 5, 8 | Contact W11. |
| + | 12 | 0, 7 | Contact W12. |
| + | 13 | 1, 4 | Contact W13. |
| + | 14 | 0, 3, 6 | Contact W14. |
| + | 15 | 2, 9 | Contact W15. |
| 5a | 10 | 0 | |
| 5a | 11 | 2 | |
| 5a | 12 | 4 | |
| 5a | 13 | 8 | |
| 5a | 15 | 6 | |
| 5b | 8 | 4 | |
| 5b | 9 | 6 | |
| 5b | 10 | 8 | |
| 5b | 13 | 0 | |
| 5b | 14 | 2 | |
| 6a | 8 | 9 | |
| 6a | 12 | 1 | |
| 6a | 13 | 5 | |
| 6a | 14 | 7 | |
| 6a | 15 | 3 | |
| 6b | 8 | 1 | |

SWITCH GANG B (TENS)—Continued

| Lead Input | Section (Switch) | Common Contacts | Output (From Movable Contact) |
|---|---|---|---|
| 6b | 9 | 3 | |
| 6b | 10 | 5 | |
| 6b | 11 | 7 | |
| 6b | 12 | 9 | |
| 7a | 8 | 6 | |
| 7a | 9 | 8 | |
| 7a | 13 | 2 | |
| 7a | 14 | 4 | |
| 7a | 15 | 0 | |
| 7b | 9 | 0 | |
| 7b | 10 | 2 | |
| 7b | 11 | 4 | |
| 7b | 12 | 6 | |
| 7b | 15 | 8 | |
| 8a | 8 | 3 | |
| 8a | 9 | 5 | |
| 8a | 10 | 7 | |
| 8a | 11 | 9 | |
| 8a | 14 | 1 | |
| 8b | 11 | 1 | |
| 8b | 12 | 3 | |
| 8b | 13 | 7 | |
| 8b | 14 | 9 | |
| 8b | 15 | 5 | |
| + | 16 | 4, 5 | Contact W16. |
| + | 17 | 0, 1, 6, 7, 8 | Contact W17. |
| + | 18 | 3, 4, 9 | Contact W18. |
| + | 19 | 0, 1, 6, 7 | Contact W19. |
| + | 20 | 2, 3, 8, 9 | Contact W20. |
| + | 21 | 0, 5, 6 | Contact W21. |
| + | 22 | 1, 2, 3, 8, 9 | Contact W22. |
| + | 23 | 4, 5 | Contact W23. |
| + | 24 | 0, 1, 2, 7, 8 | Contact W24. |
| + | 25 | 3, 4, 5 | Contact W25. |
| 5a | 17 | 2 | |
| 5a | 20 | 4 | |
| 5a | 23 | 6 | |
| 5b | 18 | 8 | |
| 5b | 22 | 0 | |
| 5b | 25 | 2 | |
| 6a | 18 | 5 | |
| 6a | 21 | 7 | |
| 6a | 24 | 9 | |
| 6b | 20 | 1 | |
| 6b | 23 | 3 | |
| 6b | 16 | 9 | |
| 7a | 19 | 8 | |
| 7a | 23 | 0 | |
| 7a | 16 | 6 | |
| 7b | 18 | 2 | |
| 7b | 21 | 4 | |
| 7b | 24 | 6 | |
| 8a | 17 | 9 | |
| 8a | 21 | 1 | |
| 8a | 24 | 3 | |
| 8b | 19 | 5 | |
| 8b | 22 | 7 | |
| 8b | 25 | 9 | |
| 8b | 16 | 3 | |
| + | 27 | 0, 1 | Contact W27. |
| + | 28 | 0, 1, 2, 3, 4 | Contact W28. |
| + | 29 | 2, 3, 4, 5, 6, 7 | Contact W29. |
| + | 30 | 5, 6, 7, 8, 9 | Contact W30. |
| + | 31 | 8, 9, 0 | Contact W31. |
| + | 32 | 1, 2, 3, 4, 5, | Contact W32. |
| + | 33 | 4, 5, 6, 7, 8 | Contact W33. |
| + | 34 | 7, 8, 9 | Contact W34. |
| + | 35 | 0, 1, 2, 3 | |
| + | 35 | 6, 7, 8, 9 | |
| 5a | 27 | 2 | |
| 5a | 32 | 6 | |
| 5b | 30 | 4 | |
| 6a | 28 | 5 | |
| 6a | 33 | 9 | |
| 6b | 31 | 7 | |
| 7a | 29 | 8 | |
| 7b | 32 | 0 | |
| 7b | 34 | 6 | |
| 8a | 31 | 1 | |
| 8b | 27 | 9 | |
| 8b | 33 | 3 | |
| + | 36 | 3, 4, 5, 6, 7, 8, 9 | |
| + | 37 | 0, 1, 2, 3, 4 | |
| + | 38 | 9 | |
| + | 39 | 0 | |
| + | 40 | 4, 5, 6, 7, 8, 9 | |
| + | 41 | 0, 1, 2, 3, 4, 5 | |
| 5a | 41 | 6 | |
| 5b | 36 | 2 | |
| 6a | 37 | 5 | |
| 6b | 42 | 9 | Contact W42. |
| 7b | 38 | 8 | |
| 8a | 39 | 1 | |
| + | 43 | 6, 7, 8, 9 | Contact W43. |
| + | 44 | 7, 8, 9 | Contact W44. |
| + | 45 | 0 | Contact W45. |
| 5b | 44 | 6 | |
| 6b | 43 | 5 | |
| 8a | 45 | 1 | |
| 9x | 46 | 2, 3, 4, 5, 6, 7, 8, 9 | |
| 8b | 46 | 1 | |

SWITCH GANG C (HUNDREDS)

| Section (Switch) | Common Contacts | Input | Output |
|---|---|---|---|
| 1 | 0,2,4,6,8 | W2 | binary 4 |
| 1 | 1,3,5,7,9 | W3 | binary 4 |
| 2 | 0,4,8 | W4 | binary 8 |
| 2 | 1,5,9 | W5 | binary 8 |
| 2 | 2,6 | W6 | binary 8 |
| 2 | 3,7 | W7 | binary 8 |
| 3 | 0,8 | W8 | binary 16 |
| 3 | 3 | W9 | binary 16 |
| 3 | 6 | W10 | binary 16 |
| 3 | 1,9 | W11 | binary 16 |
| 3 | 4 | W12 | binary 16 |
| 3 | 2 | W13 | binary 16 |
| 3 | 5 | W14 | binary 16 |
| 3 | 7 | W15 | binary 16 |
| 4 | 0 | W16 | binary 32 |
| 4 | 1 | W17 | binary 32 |
| 4 | 2 | W18 | binary 32 |
| 4 | 3 | W19 | binary 32 |
| 4 | 4 | W20 | binary 32 |
| 4 | 5 | W21 | binary 32 |
| 4 | 6 | W22 | binary 32 |
| 4 | 7 | W23 | binary 32 |
| 4 | 8 | W24 | binary 32 |
| 4 | 9 | W25 | binary 32 |
| 5 | 1 | W27 | binary 32 |
| 5 | 2 | W28 | binary 32 |
| 5 | 3 | W29 | binary 32 |
| 5 | 4 | W30 | binary 32 |
| 5 | 5 | W31 | binary 64 |
| 5 | 7 | W32 | binary 64 |
| 5 | 8 | W33 | binary 64 |
| 5 | 0 | W34 | binary 64 |
| 5 | 6 | B sec 35, contacts 1,2,3,0 | binary 64 |
| 5 | 9 | B sec 35, contacts 6,7,8,9 | binary 64 |
| 6 | 4,9 | + | binary 128 |
| 6 | 1,2,3,5,6,7 | + | binary 128 |
| 6 | 8 | W42 | binary 128 |
| 7 | 3,4,8,9 | + | binary 256 |
| 7 | 2 | W43 | binary 256 |
| 7 | 7 | W44 | binary 256 |
| 7 | 5 | W45 | binary 256 |
| 8 | 5,6,7,8,9 | + | binary 512 |

From a consideration of the above detailed description, it will be readily apparent that the system of the present invention may be variously applied to energize binary devices in accordance with decimal indications applied to the system. An important feature of the present invention resides in the consideration that standard electrical components may be employed to manufacture the system without the expense of custom-made parts.

Another important feature of the present invention resides in the consideration that there are no ambiguous states which could manifest two different decimal numbers.

Although these and other important features of the present invention are apparent in the described embodiment of the invention, it will also be apparent that the present invention provides an apparatus capable of many variations and modifications, consequently the present invention is not to be limited to a particular arrangement as herein shown and described except as defined by the appended claims.

What is claimed is:

1. An electrical conversion system for translating decimal value indications to binary number signal indications, comprising: plural sets of ganged switches, each switch having at least ten positions indicative of decimal values and including a plurality of fixed contacts and plural movable contacts each movable to said ten positions to engage said fixed contacts; means for setting each of said sets of ganged switches in accordance with a particular decimal digit of the value to be translated; a plurality of signal paths, each for manifesting one digit of a binary number; at least one first group of conductors connecting certain fixed contacts of a first of said ganged switches to one of said signal paths; plural second groups of conductors connecting predetermined fixed contacts of said first of said ganged switches to predetermined fixed contacts of a second of said ganged switches; means for connecting the movable contacts of said second of said ganged switches to selected of said signal paths; and means for connecting said movable contacts of said first of said ganged switches, and said plurality of signal paths across a source of potential.

2. A system for use with a source of electrical potential for energizing plural representative binary means which individually manifest binary digits, in accordance with selected decimal values comprising: a plurality of ganged ten-position switches, each switch including a plurality of fixed contacts and plural movable contacts to individually engage certain of said fixed contacts thereof according to the position of said switch; means for setting each of said ganged switches in accordance with a particular decimal digit of the value to be translated; means for connecting the movable contacts of a first of said switches to said source of electrical potential; means for connecting a group of the stationary contacts in said first of said switches directly to one of said binary means; means for connecting other stationary contacts of said first of said switches to the stationary contacts of a second of said switches; and means for connecting the movable contacts of said second of said switches to said binary means.

3. A system for use with a source of electrical potential for energizing plural representative binary means which individually manifest binary digits, in accordance with selected decimal values comprising: a plurality of ganged ten-position switches, each switch including a plurality of fixed contacts and plural movable contacts to matingly engage said certain of said fixed contacts thereof; means for setting each of said ganged switches in accordance with a particular decimal digit of the decimal value to be translated; means for connecting the movable contacts in a first of said switches to a source of signal potential; means connecting the stationary contacts representing odd digits in a first gang of said first of said switches to one of said binary means; means for connecting other of the stationary contacts in said first of said switches to certain stationary contacts of other of said switches; means for connecting certain of the movable contacts of a second of said switches to said binary means; means for connecting other of the movable contacts in said second of said switches to stationary contacts in a third of said switches; and means for connecting certain of the movable contacts of said third of said switches to said binary means.

References Cited by the Examiner

UNITED STATES PATENTS 2,693,593 11/1954 Crosman ---------- 340—347

OTHER REFERENCES

Publication: Mathematical Logic for Digital Computer Designers, by Geo. W. Patterson, Moore School of Electrical Engineering, 1962.

MALCOLM A. MORRISON, *Primary Examiner.*

JOHN F. BURNS, *Examiner.*

R. C. BAILEY, L. W. MASSEY, *Assistant Examiners.*